W. L. WEST.
Bee Hive.
No. 22,908.
Patented Feb. 8, 1859.
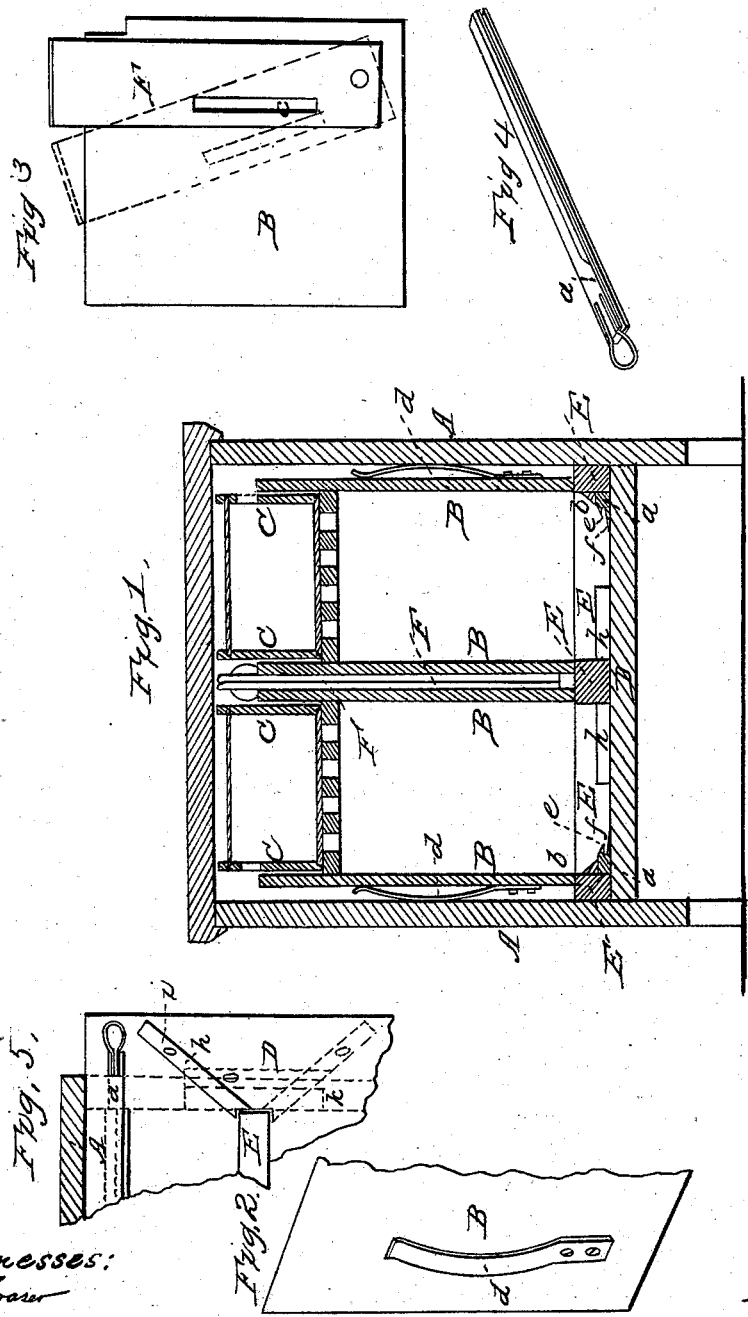

UNITED STATES PATENT OFFICE.

WM. L. WEST, OF ELMIRA, NEW YORK.

BEEHIVE.

Specification of Letters Patent No. 22,908, dated February 8, 1859.

*To all whom it may concern:*

Be it known that I, WILLIAM L. WEST, of Elmira, in the county of Chemung and State of New York, have invented a new and useful Improvement in Beehives; and I do hereby declare that the following is a full, clear, and exact description thereof, reference being had to the accompanying drawings, making a part of this specification, and to the letters of reference marked thereon.

Figure 1 is a vertical longitudinal section. Fig. 2 is a perspective view of one of the adjusting springs attached to the sections. Fig. 3 is an elevation showing the connecting passage and movable partition. Fig. 4 is a perspective view of the moth-trap. Fig. 5 is a plan view of a portion of the bottom board showing the shutter bar and the method of applying it.

Similar letters refer to like parts in all of the figures.

To enable others to make and use my invention I will proceed to describe its construction.

It consists of a frame or case A A, containing the two sections or interior cases B B, in the upper part of which are placed the honey boxes C C. The sections B B, are of a size sufficiently large to contain the swarm of bees in the lower part, and are provided with slots or longitudinal openings in the top, on which the honey boxes rest, they also having similar slots placed transversely of their bottoms so as to cross each other when placed in connection. The spaces thus left allow the bees free access to the upper boxes, and also allow a free circulation of air through the honey cells. These sections are made open at the bottom, and are supported by the rails E E which extend around the inside of the case A. A passage *c* Fig. 3, through the inside partition of each section, allows the bees to go from one section to the other, but can be closed by means of the movable partition F. This partition has a slot cut through it of the same dimensions as that in the side of the section, and when placed perpendicular the holes all coincide and form an open passage; but by moving either one to the position indicated by the dotted lines the passage is closed. In the ordinary hive this passage is the cause of considerable loss, as it frequently happens that owing to the weather or other causes the lumber of which the hive is made shrinks, and a space is left between the sections in which the bees lose themselves, and are destroyed. To obviate this, and at the same time to render the hive more easily constructed, I attach an elliptic spring *d* Figs. 1 and 3, to the outer side of each section at or near the center. This spring is made large enough to press against the inner side of the case when the sections are shrunk to their smallest dimensions, and exert a constant pressure which serves to keep the movable partitions F F, in contact at all times. When the sections swell from dampness the springs yield, and thus prevent any undue strain upon the case. As the partitions F, are the only parts of the hive that come in contact they only require fitting, and the other surfaces may be left in the rough, though I prefer making them smooth as they not only look better but will last longer.

It appears from practical tests that the shrinking and swelling of the parts of the hive have no injurious effect on the working of the bees other than exposing them to be lost or crushed in the crevices and joints that are thus laid open; but the use of the opposing springs *d d* by insuring contact of those parts forming the passage from one section to the other effectually overcomes this difficulty, and at the same time effects a great saving of expense in the construction of the hive, as it accomplishes in a perfect manner what has heretofore been but very imperfectly done by a great deal of fitting and careful workmanship.

The orifice *g* for the admission of the bees from without is formed at the bottom of the front side of the case, and extends for several inches each side of the center rail E, and communicates with either section. This opening is furnished with a shutter-bar *h*, Figs. 1 and 5, which consists of a small rectangular piece of board of a size and length corresponding to the opening. It has a notch at one end to fit the corner of the center rail E, and a pin *i* to secure it in the desired position. When it is desired to exclude the bees from one section the notched end of the shutter bar *h* is placed against the corner of the rail E, as shown in Fig. 5, and the side in contact with the case so as to completely close the passage to one of the sections. In this position it is secured by inserting the pin *i*. In this manner either section of the hive can be closed as required; but if both are to be closed at the same time the bar $h$ is placed longitudinally in the orifice so as to fill it entire. When thus placed one of the projecting points of the bar is inserted into a notch or recess in the end of the opening at $k$, and the pin $i$ in a hole formed for its reception and the entire opening is securely closed against the egress or ingress of the bees. These different positions of the shutter-bar are represented in dotted lines in Fig. 5. The bottom of the hive inclines toward the openings at a slight angle for the purpose of enabling the bees to clear out more readily whatever is offensive to them, and also to allow any liquid or condensed moisture to escape. The bottom board can be let down so as to clear it off when necessary, or when a new swarm is to be hived. With this arrangement of the bottom board a new construction of moth-trap has been found necessary. It consists of a long strip of board $a$ with a groove about $\frac{1}{8}$ of an inch wide and $\frac{1}{4}$ of an inch deep extending nearly its length. It is placed at each lower outside corner of the hive between two triangular strips one of which $b$ is placed above and the other $f$ at its inner side forming between them and in connection with the angle of the case a groove in which the trap $a$ slides. The pieces $b$ and $f$ fill up the corners leaving the groove in the trap the only one in which the bee-moth can deposit its eggs beyond the reach of the bees, and when thus deposited they can be destroyed by withdrawing the trap and clearing out the groove. This form of trap is simple and effectual. It requires very little time or attention and can be removed for the purpose of cleaning without disturbing the bees.

The whole arrangement is simple and cheap and can be kept in good order with much less attention than is required in other hives now used.

What I claim as my invention and desire to secure by Letters Patent is—

The use of the opposing springs $d\ d$ for the purpose of insuring a contact of the parts continguous to the passageway $c$ substantially as described.

WILLIAM L. WEST.

Witnesses:
J. Fraser,
O. H. Fraser.